United States Patent [19]
Titterington et al.

[11] 3,820,956
[45] June 28, 1974

[54] KIPP TYPE GAS GENERATOR WITH MOVABLE LIQUID REACTANT EXIT PORT

[75] Inventors: William Alexander Titterington, Lynnfield; Robert White Milgate, Jr., Marblehead, both of Mass.

[73] Assignee: General Electric Company, Wilmington, Mass.

[22] Filed: June 1, 1972

[21] Appl. No.: 258,511

[52] U.S. Cl................... 23/282, 9/321, 9/324, 48/29, 48/10, 48/35, 48/4, 137/592, 137/242
[51] Int. Cl............................................... B01j 7/02
[58] Field of Search.......... 23/282; 9/321, 324, 325; 48/29, 10, 35, 4, 57, 12; 137/592, 242

[56] References Cited
UNITED STATES PATENTS
| | | | |
|---|---|---|---|
| 635,599 | 10/1899 | Russell | 48/29 |
| 2,516,934 | 8/1950 | Weaver | 23/282 |

*Primary Examiner*—James H. Tayman, Jr.
*Attorney, Agent, or Firm*—I. David Blumenfeld

[57] ABSTRACT

A chemical gas generator of the "Kipp" type is described in which the delivery port for the liquid reactant is continually repositioned as the solid chemical is consumed during gas generation. A solid chemical, such as sodium aluminum hydride, is mounted on a spring loaded perforated support plate. The liquid reactant is introduced through a delivery tube which has an exit port located below the perforated support plate. A thin walled, easily ruptured tube, preferably of plastic, surrounds the delivery tube.

A perforating element or knife is attached to the spring loaded pressure plate. As the solid chemical is consumed in generating gas, the spring loaded pressure plate moves upward. The perforating element, or knife moves upward along with the pressure plate perforating the plastic tube so that the liquid reactant delivery port is always positioned a fixed distance from the reaction site and the flow of reactant is not affected by the accumulation of the solid products of the reaction. Consumption of the chemical in the generator thus causes movement of the delivery port as a function of the consumption rate of the chemical thereby maintaining the port continuously above the accumulating layer of the solid products of reaction.

4 Claims, 2 Drawing Figures

PATENTED JUN 28 1974  3,820,956

KIPP TYPE GAS GENERATOR WITH MOVABLE LIQUID REACTANT EXIT PORT

This invention relates to a gas generator, and more particularly, to a generator for producing hydrogen gas by contact of a liquid reactant with a solid chemical in which the exit port for delivering the liquid reactant to the reaction surface is continuously moved as the chemical is consumed.

The production of a gas, such as hydrogen, for example, by contact of a liquid and a solid is well-known to those skilled in the art. One category of such generators are the so-called "Kipp" generators. These generators function by bringing a liquid reactant into contact with a reaction surface represented by a solid chemical located within the generator. As gas accumulates within the generator, the liquid is slowly forced out of contact with the solid reaction surface so that the rate of gas evolution is reduced or stopped. Whenever a quantity of the gas thus generated is removed from the generator reducing the gas pressure, the liquid reactant again contacts the reaction surface and gas evolution begins again. One of the most important and useful features of "Kipp" generators resides in this demand responsive characteristic — that is the rate at which gas is generated depends on the rate it is withdrawn from the generator. When gas removal is slowed, the evolution of gas is reduced proportionately. This is a significant advantage as no elaborate controls are required to generate at the required rate since, for most practical applications, the system is self-regulating. This is of major importance in applications where the generator and the equipment using the gas thus generated, such as fuel cells, for example, are remotely located so that adjustment is difficult.

In typical "Kipp" generators, a solid chemical charge is supported in a housing and a liquid reactant is introduced through a suitable port located at some fixed distance below the reaction site, i.e., the surface of the solid chemical which reacts with the liquid. As the chemical is consumed by its reaction with the liquid during gas generation, residual solid products of some reactions may be produced and these reaction products accumulate below the reaction site. As more and more residual solid products are formed, they may build up sufficiently to cover the delivery port thereby blocking or restricting the flow of the liquid reactant. As a result, the gas generating capacity of the generator is restricted or stopped even though the solid chemical and the reactant liquid have not been completely consumed. Consequently, the generator is disabled long before its normal design lifetime.

It is therefore, one of the principal objectives of this invention to provide a gas generator of the "Kipp" type which is long lasting, requires a minimum of maintenance, and is capable of long term operation.

A further objective of the invention is to provide a hydrogen generator of the "Kipp" type in which flow of the liquid reactant to the reaction site is not affected by the accumulation of residual solid products of the reaction.

Still another objective of the invention is to provide a gas generator of the "Kipp" type in which the exit port for the reactant liquid is repositioned as the reaction site due to consumption of the solid chemical changes so that the flow of liquid reactant to the reaction site is unaffected by the accumulation of residual solid products of the reaction.

Still other objectives and advantages of the invention will become apparent as the description thereof proceeds.

The various objectives and advantages of the invention are realized in a hydrogen gas generator of the "Kipp" type in which precompressed shaped chemical is positioned on a spring loaded, perforated pressure plate. A liquid reactant delivery tube extends into the housing and has an exit port positioned below the pressure plate to supply liquid reactant to the solid chemical. The liquid delivery tube includes a thin walled plastic outer cylinder which is easily perforated. A knife or perforating device is attached to the spring loaded pressure plate. As the solid chemical is consumed in the generation of gas, the pressure plate is forced upward by the spring thus moving the pressure plate upward along with the reaction site. Movement of the pressure plate moves the knife upward perforating or slitting the plastic tube surrounding the liquid delivery tube. As a result, the reactant exit port from the delivery tube moves upward. The movement of the exit port is therefore fixed by the rate of chemical consumption and maintains the exit port at a predetermined distance below the reaction site at all times thus eliminating the possibility that the liquid reactant exit port will be blocked by the residual solid products of the reaction required to generate the gas. By means of this arrangement, the gas generator remains operative until the entire mass of solid chemical positioned therein is consumed and the possibility of a blockage or interference with the gas generation due to the formation of the solid reaction products is avoided.

Other features believed characteristic of this invention are set forth in detail in the appended claims. The invention itself, however, together with many objects and advantages thereof will be best understood by reference to the following description taken in conjunction with the accompanying drawings in which:

Figure 1:
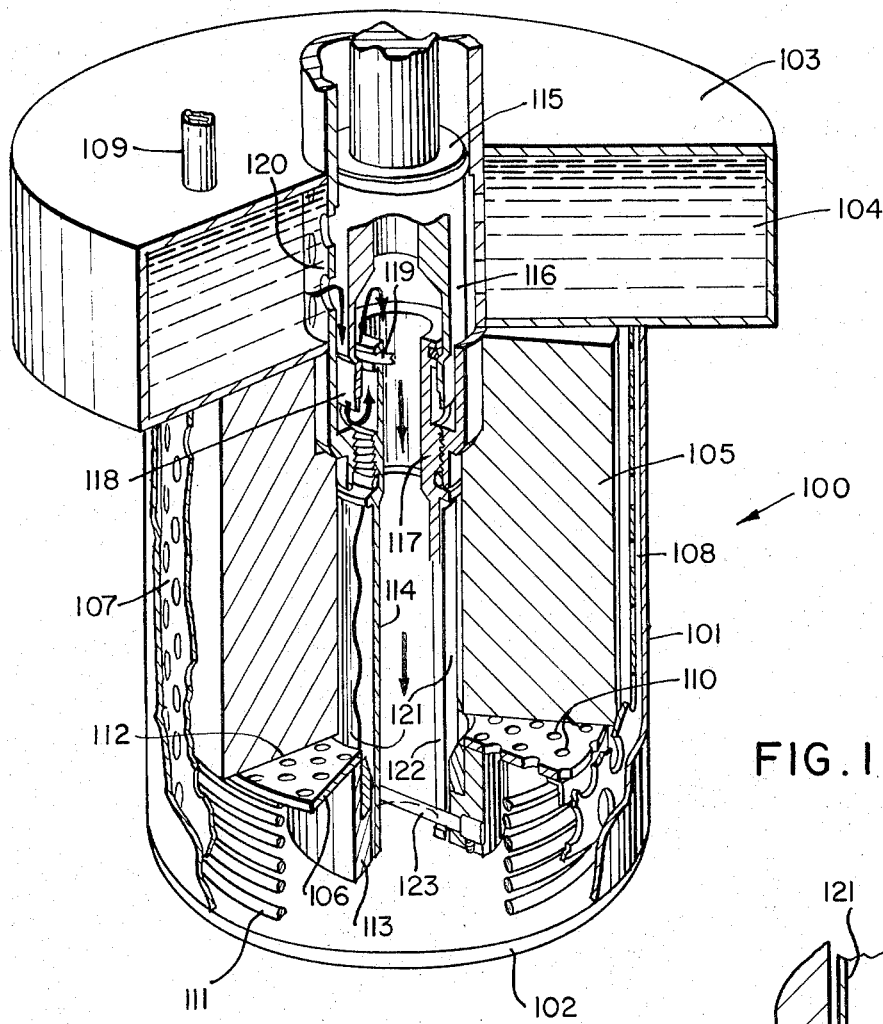
FIG. 1 is a perspective of a gas generator constructed in accordance with the invention.

FIG. 1 shows a partially cutaway perspective of a gas generator 100 which has an outer housing 101 having a closed lower end 102 and terminating at its upper end in a liquid reactant storage tank or reservoir 103. The storage tank or reservoir 103 contains a liquid reactant 104 which reacts with a shaped, solid precompressed chemical 105 retained in housing 101. In one form of hydrogen generation the liquid reactant is water ($H_2O$) and the solid chemical is sodium aluminum hydride ($Na\ Al\ H_4$). The reaction of water and sodium aluminum hydride produces hydrogen and sodium hydroxide + aluminum hydroxide as solid reaction products in accordance with the following equation:

$$4\ H_2O + Na\ Al\ H_4 \rightarrow NaOH + Al\ (OH)_3 + 4H_2$$

The sodium aluminum hydride is supported on a spring loaded, perforated pressure plate 106 and is held within housing 101 by a cylindrical screen 107 which surrounds the chemical to hold it in place while permitting passage of the gas generated at the reaction site. The gas flows through passageway 108 between screen 107 and housing 101 and is removed through gas exit tube 109 passing through liquid reactant reservoir 103 to the exterior of the generator liquid reactant reservoir 103.

Pressure plate 106 contains a plurality of perforations 110 and is supported by a coil spring 111 which forces it against the lower surface 112 of the chemical reactant. Pressure plate 106 is mounted on an annular holder 113 which surrounds a liquid delivery tube 114 and moves axially along the liquid delivery tube under the action of coil spring 111 as the chemical is consumed during the generation of the gas.

The pressure plate which supports the block of sodium aluminum hydride is shown as a plate containing a plurality of perforations 110. It will be obvious, however, that other forms of a supporting member such as screens, wire mesh or the like may also be used. The structure must be rigid enough to support the block and open enough to permit the liquid to penetrate and contact the lower surface.

Liquid delivery tube 114 communicates with storage reservoir 103 and flow of the liquid reactant is controlled by a series of valves shown generally at 115 which are actuated to put the generator in operation. Valve 115 has a movable valve stem 116 which cooperates with a fixed member 117 which is screwed to the top of delivery tube 114. A valve skirt 118 on stem 116 overlaps fixed valve portion 117 and has an interior shoulder which cooperates with O-ring 119 to control flow of the liquid into the delivery tube. Simultaneously, the upper O-ring may be moved away from a corresponding shoulder to permit flow of air into the generator so that the flow of the liquid may be facilitated. When valve stem 116 is pushed down, skirt 118 moves sufficiently so that the interior shoulder moves away from the O-ring to allow flow of the liquid as shown by the arrows. The flow is through opening in an interior reservoir wall 120 down along the outside of the skirt 119 and then through a passageway between the skirt and the fixed valve member past O-ring 119 and into tube 114. With the stem pulled upward, the inner shoulder of skirt 118 is pressed against O-ring 119 preventing passage of the liquid.

Surrounding liquid delivery tube 114 is a thin walled, easily ruptured tube 121 which is fabricated of plastic and the like. The tube must fit tightly over the delivery tube to prevent any leakage. Preferably, the tube is shrink-fitted to delivery tube 113 and bonded at the top and bottom to prevent movement during perforation. Tube 121 is fabricated of a 2 mil shrinkable flourocarbon plastic such as DuPont Teflon. Tube 121 is easily perforated to change the location of the liquid reactant exit port, as the chemical in the gas generator is consumed. To this end, a pair of guide slots 122 are provided on opposite sides of the liquid delivery tube 114 and a knife or other perforating mechanism 123 is positioned in the slot and supported in the movable, annular holder 113. Initially, knife 123 is positioned to perforate the plastic tube near the bottom of the liquid delivery tube to provide an exit port for the reactant liquid near the lower end of the delivery tube. The liquid fills the lower part of housing 101 and flows through the perforated pressure plate 106 to contact surface 112 of the chemical. As gas is generated and the chemical is consumed, coil springs 111 push pressure plate 106 and holder 113 upward along the liquid delivery tube. As the pressure plate moves upward, knife blade 123 and the movable holder are pulled upward and the knife slits tube 121 thereby moving the reactant liquid exit port axially upward. As a result, the residual solid products of the reaction, i.e., the (sodium and aluminum hydroxide) which are formed at the reaction site and fall to the bottom of the container will not block the liquid reactant exit port. It can be seen therefore, that the liquid reactant exit port is always above the accumulating layer of the solid reaction products and is maintained at a fixed distance below the reaction site, i.e., the lower surface of the chemical in the gas generator.

In operation, the gas generator is assembled by placing the perforated pressure plate, spring, liquid delivery tube in the housing and thereafter positioning the solid, compressed pre-formed chemical in the housing. Valve 115 is closed by pulling the valve stem upward so that the interior shoulder of skirt 118 is pressed against O-ring 119 thereby disabling the generator.

The liquid reactants storage reservoir is then filled with the reactant, and a suitable valve, not shown, in the gas exit tube 109, is closed. The gas generator is then fully primed and ready for operation. When the gas generator is to be placed into operation, valve stem 116 is pushed downward so that the skirt 118 moves downward and away from O-ring 119 thereby opening a passage between the liquid reactant reservoir and the liquid delivery tube 114. That is, the liquid in the reservoir flows through the openings in wall 120 and, as shown by the arrows, along the outside of the valve skirt 118 through a passage between the valve skirt and the inner portion of the valve stem, past O-ring 119 and then through the delivery tube to the perforation in plastic tube 121 at the bottom of the delivery tube. That is, the liquid flows down the tube through guide slots 122 in the delivery tube and thence to the exit port in plastic tube 121. The liquid exits into the storage volume at the bottom of the housing filling the storage volume until it passes through the openings in plate 106 and contact is made with the lower surface of the sodium aluminum hydride block. Gas is generated at the reaction site and flows radially outward through screen 107 and upward through passageway 108 to gas exit tube 109. Gas pressure generated by the chemical reaction maintains the level of reactant solution at or near the reaction site depending on the gas demand. Opening or closing of a valve in tube 109 will cause the solution either to back away or to contact the chemical at the reaction site depending on the gas demand.

Figure 2:
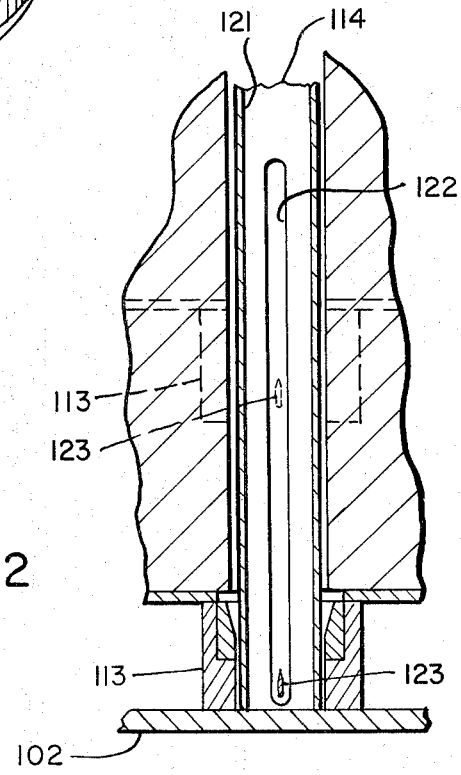
FIG. 2 is a position of the generator of FIG. 1 taken along the lines 2—2 of FIG. 1 and illustrates the slot or guideway in which the knife or perforating element of the invention moves.

As the chemical is consumed, spring 111 moves pressure plate 106 upward to maintain contact with the chemical. Since knife 123 and knife holder 113 are attached to the pressure plate, these components also move upward in guide slots 122 slitting plastic tube 121 thus moving the exit port upward. This may be seen most clearly in FIG. 2 which shows the movable knife holder 113 in its original position at or near the bottom of the container. The exit port for the liquid reactant is thus near the bottom of the gas generator. As the chemical is consumed, knife holder 113 moves upward along the slot 122 and knife 123 slits the tube so that the liquid reactant delivery port moves up and is always maintained at a fixed distance below the reaction site. Consequently, deposition of the solid products of reaction do not affect the operation of the gas generator since the exit port will not be blocked by the accumulation of these components.

It can be seen therefore, that a gas generator configuration has been described which provides a chemical gas generator of the "Kipp" type which occupies a minimum volume, stores any solid products of reaction and maintains both the reaction site and liquid solution delivery port above any accumulated layers of the residual chemical solids so that maximum utilization of the chemical and the liquid reactant solution is possible and safe, long term, reliable operation of the gas generator is achieved.

While this invention has been described in connection with a gas generator, which uses sodium aluminum hydride as a solid chemical and water as the liquid reactant solution to form hydrogen, it will be appreciated by those skilled in the art that the present invention is not limited to this combination of chemicals and liquid reactants nor to the generation of hydrogen. It will be obvious that the invention is applicable to any chemical gas generator in which a gas is generated by the reaction of a chemical and a liquid reactant and in which the gas producing reaction results in residual solid products of the reaction which accumulate below the reaction zone and would, in the absence of the arrangement disclosed and taught by the instant invention, ulitmately affect the operation of the gas generator by blocking or interfering with the liquid reactant exit port.

While this invention has been described with particular reference to a hydrogen gas generator, of a particular configuration, it will be obvious that many modifications may be made in the instrumentalities and structures employed may be made. It is contemplated by the appended claims to cover any such modifications which fall within the true spirit and scope of this invention.

What is claimed as new and desired to be secured by Letters Patent of the United States is:

1. A gas generator comprising:
   a. means defining a chamber for holding a reactant,
   b. a movable spring loaded supporting element positioned in said chamber, said supporting element allowing passage of a liquid therethrough,
   c. a solid chemical member postioned on said supporting means, said chemical reacting upon contact with a liquid reactant to generate a gas,
   d. liquid delivery means projecting into said chamber to a level below said supporting element for delivering a liquid reactant to said chemical including easily rupturable wall means,
   e. perforating means positioned for movement along said delivery means and positioned to rupture said wall and provide an exit port for said liquid reactant,
   f. means coupling said perforating means to said movable spring loaded supporting element for causing said perforating means to move with said spring loaded support means along said delivery means to produce new exit port as the solid chemical is consumed whereby said exit port is always maintained at a fixed distance below the reaction site and blockage of the exit port by solid reaction products is prevented.

2. The gas generator according to claim 1 wherein said liquid delivery means comprises a delivery tube having slots along its length, and said easily rupturable wall member comprising a tightly adhering tube surrounding said delivery tube.

3. The gas generator according to claim 2 wherein said perforating means comprises a knife edge movable in the slots in said delivery tube.

4. The gas generator according to claim 1 wherein the means for moving said perforating element comprises a collar attached to said spring loaded support means for slidable movement along said tubular liquid delivery means.

* * * * *